United States Patent
Gao et al.

(10) Patent No.: US 7,149,632 B1
(45) Date of Patent: Dec. 12, 2006

(54) ON-LINE SYSTEM AND METHOD FOR PROCESSING INFORMATION RELATING TO THE WEAR OF TURBINE COMPONENTS

(75) Inventors: Dongming Gao, Clifton Park, NY (US); Hamid Reza Sarshar, Clifton Park, NY (US); Hong Xia, Schenectady, NY (US); Richard Anthony Elliott, Acworth, GA (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 10/249,015

(22) Filed: Mar. 10, 2003

(51) Int. Cl.
*G06F 19/00* (2006.01)
(52) U.S. Cl. .......................... 702/34; 702/188; 73/577
(58) Field of Classification Search ............ 702/33–36, 702/56, 105, 113–115, 122, 182–185, 187–188; 73/1.84, 577–578; 700/287–290, 32–34; 345/966–970
See application file for complete search history.

(56) References Cited

U.S. PATENT DOCUMENTS

| | | | | |
|---|---|---|---|---|
| 5,162,659 | A * | 11/1992 | Diamond et al. | 250/559.13 |
| 5,749,218 | A | 5/1998 | Cromer et al. | |
| 6,014,287 | A * | 1/2000 | Ehlers et al. | 360/224 |
| 6,041,287 | A * | 3/2000 | Dister et al. | 702/182 |
| 6,173,159 | B1 * | 1/2001 | Wright et al. | 455/66.1 |
| 6,343,251 | B1 * | 1/2002 | Herron et al. | 701/100 |
| 6,378,371 | B1 | 4/2002 | Aksit et al. | |
| 6,408,259 | B1 * | 6/2002 | Goebel et al. | 702/183 |
| 6,421,571 | B1 * | 7/2002 | Spriggs et al. | 700/17 |
| 6,438,484 | B1 * | 8/2002 | Andrew et al. | 701/100 |
| 6,499,114 | B1 * | 12/2002 | Almstead et al. | 714/25 |
| 6,542,856 | B1 * | 4/2003 | Frantz et al. | 702/188 |
| 6,556,956 | B1 * | 4/2003 | Hunt | 702/188 |
| 6,636,813 | B1 * | 10/2003 | Isobe et al. | 702/34 |
| 6,644,917 | B1 * | 11/2003 | Zhao et al. | 415/200 |
| 6,668,272 | B1 * | 12/2003 | Keller et al. | 709/203 |
| 6,760,689 | B1 * | 7/2004 | Follin et al. | 702/188 |
| 2003/0200060 | A1 * | 10/2003 | Eryurek et al. | 702/188 |

OTHER PUBLICATIONS

Jennifer E. Gill, Uprate Options for the MS900A Heavy-Duty Gas Turbine, pp. 1-18.

* cited by examiner

*Primary Examiner*—Marc S. Hoff
*Assistant Examiner*—Mary Catherine Baran
(74) *Attorney, Agent, or Firm*—Nixon & Vanderhye, P.C.

(57) ABSTRACT

A method comprises storing data relating to the wear of a component of at least one turbine system in a database of a system for processing wear related information, generating a displayable menu containing a plurality of user-selectable links respectively associated with software modules of the system, and receiving an on-line selection of one of the user-selectable links to enable the associated software module of the system to generate displayable content including information relating to the wear of the component of the turbine system. The selected module may enable a quantitative amount of the wear of the component or qualitative wear range characterizing the amount of the wear of the component to be input and received on-line. Alternatively, the selected module may enable a component type to be input and received on-line and display a component fleet leader.

4 Claims, 22 Drawing Sheets

| | | | | | |
|---|---|---|---|---|---|
| File Edit View Go Favorites Help | | | | | |

Click here to go to: General Information | Can Assemblies | Liner Assembly (Can 1) | Fuel Nozzle Assembly (Can 1)

Search Database

HOME

Logout

Next Can

Input Portal -TP Assembly

Serial Number: 295816 | Can Number: 1 | Inspection Date: 10/1/1996

| | Quantitative Wear | Wear Range | Replaced | Picture (optional) | Serial Number |
|---|---|---|---|---|---|
| TP Body Assembly: | | | ○Yes ●No | | 2633 |
| H Block: | (mils) | light (0 - 10) | | | |
| Fwd Inner: | (mils) | | | | |
| Outer Floating Seal: | (mils) | light (0 - 5) | | | |
| Inner Floating Seal: | (mils) | light (0 - 5) | | | |
| Aft Frame Wear: | (mils) | | | | |
| TBC: | (Spalling Area) (sq.ins) | (Spalling Range) | | | |

| | Quantitative Wear | Wear Range | Replaced | Picture (optional) |
|---|---|---|---|---|
| Bull Horn Cover: | (mils) | | ○Yes ●No | |
| Side Seal: | (mils) | medium (11-40) | ●Yes ○No | |
| Aft Frame Creep(Left): | (mils) | | | |
| Aft Frame Creep(Center): | (mils) | | | |
| Aft Frame Creep(Right): | (mils) | | | |

| | | | | | | | | | | |
|---|---|---|---|---|---|---|---|---|---|---|
| Name | Customer | Turbine Serial Number | Turbine Type | Combustor Type | Can Number | Serial Number | Replaced | Wear (mils) | Data Type | Hours |
| 2633 | Mass Power | 295816 | 7E | Standard | 1 | 2633 | FALSE | 5.0 | light (0-10) | 10087 |
| 2652 | Mass Power | 295816 | 7E | Standard | 2 | 2652 | FALSE | 0 | Quantitative | 10087 |
| 2640 | Mass Power | 295816 | 7E | Standard | 3 | 2640 | FALSE | 5.0 | light (0-10) | 10087 |
| 2369 | Mass Power | 295816 | 7E | Standard | 4 | 2669 | FALSE | 5.0 | light (0-10) | 10087 |
| 2642 | Mass Power | 295816 | 7E | Standard | 5 | 2642 | FALSE | 5.0 | light (0-10) | 10087 |
| 2631 | Mass Power | 295816 | 7E | Standard | 6 | 2631 | FALSE | 0 | Quantitative | 10087 |
| 2641 | Mass Power | 295816 | 7E | Standard | 7 | 2641 | FALSE | 5.0 | light (0-10) | 10087 |
| 2646 | Mass Power | 295816 | 7E | Standard | 8 | 2646 | FALSE | 5.0 | light (0-10) | 10087 |
| 2649 | Mass Power | 295816 | 7E | Standard | 9 | 2649 | FALSE | 5.0 | light (0-10) | 10087 |
| 2645 | Mass Power | 295816 | 7E | Standard | 10 | 2645 | FALSE | 0 | Quantitative | 10087 |
| 5128 | Cogen Tech | 295646 | 7E | Standard | 1 | 5128 | FALSE | 15.0 | medium (10-20) | 6531 |
| 5123 | Cogen Tech | 295646 | 7E | Standard | 2 | 5123 | FALSE | 5.0 | light (0-10) | 6531 |
| 5126 | Cogen Tech | 295646 | 7E | Standard | 3 | 5126 | FALSE | 0 | Quantitative | 6531 |

ON-LINE SYSTEM AND METHOD FOR PROCESSING INFORMATION RELATING TO THE WEAR OF TURBINE COMPONENTS

BACKGROUND OF INVENTION

This invention relates to an on-line system and method for processing information relating to the wear of turbine components. More specifically, this invention relates to an on-line system and method of processing information relating to the wear of combustion system interface components of a turbine system.

Turbine systems have been used to generate electricity for many years. As one example, U.S. Pat. No. 5,749,218 issued to Cromer et al. on May 12, 1998, the contents of which are incorporated herein by reference, discloses a gas turbine system for generating electricity. This gas turbine system includes a combustion system having a wear reduction kit. The wear reduction kit improves the wear characteristics at interfaces of various combustion system components which are subjected to wear as a result of combustion noise induced vibrations. The wear reduction kit allows time intervals between consecutive combustion system inspections to be increased by reducing the relative movement and associated wear of interface parts of the combustion system. With reference to FIGS. 1A–1E, the wear reduction kit of the combustion system includes, for example, the following components: (1) U-shaped wear inserts 42 and seals 40 for combustion system transition piece 16 having frame 24. Wear inserts 42 and seals 40 allow frame 24 of transition piece 16 to be secured to a first turbine stage 18. The wear resistance of slot 38 in frame 24 of transition piece 16 may be increased by choosing an appropriate material for wear inserts 42. (See FIGS. 1A and 1B).

(2) H-shaped guide blocks 60 and guide finger covers 70 for bullhorn fingers 56, 58. The interface between H-shaped guide blocks 60 and bullhorn fingers 56, 58 including bullhorn guide finger covers 70 allow combustion liner 20 to be secured to transition piece 16. The materials forming H-shaped guide blocks 60 and guide finger covers 70 are appropriately chosen to form a wear couple which reduces the wear at the interface of the H-shaped guide blocks 60 and bullhorn fingers 56. (See FIGS. 1A and 1C).

(3) A flow sleeve stop 96 having an elongated stem 102 covered by a replaceable U-shaped strip 106 and a liner stop 110. Flow sleeve stop 96 and liner stop 110 form a wear couple which enables combustion liner 20 to be inserted axially within flow sleeve 22 and to limit axial movement of combustion liner 20 within flow sleeve 22 in a direction toward transition piece 16. (See FIGS. 1A and 1D).

(4) A weld deposit material 138 and a combustion liner cap assembly 136 having an annular mounting ring 142. Weld deposit material 138 is deposited on a radially outer collar 126 of fuel nozzle tip 124 of fuel nozzle 12. The materials of deposit material 138 and ring 142 form a compatible wear couple so that most of the wear will occur on weld deposit 138 rather than ring 142 of the more complex and costly combustion liner cap assembly 136. (See FIGS. 1A and 1E).

(5) Cross fire tube 156 received within a hole 146 of combustion liner 20 and a cross fire tube collar 148. An interface is formed where cross fire tube 156 is telescopically received within cross fire tube collar 148. Cross fire tube collar 148 may be formed of a harder material than the material forming cross fire tube 156 and thus most of the wear experienced at this interface is predictably exhibited on the softer cross fire tube 156. (See FIGS. 1A and 1F).

Other inserts, seals, blocks, covers, liners, stops, strips, rings, caps, tubes and/or collars may be placed at the other interfaces of the turbine system as part of the wear reduction kit. For example, with reference to FIGS. 1A and 1G, a wear coating 171 is applied to a hula seal 170 which is arranged between transition piece 16 and combustion liner 20. A corresponding wear coating 172 is applied to transition piece 16 so that both wear coatings 171 and 172 are arranged between transition piece 16 and hula seal 170 attached to combustion liner 20. The material forming wear coating 172 may be softer than wear coating 171 so that wear on hula seal 170 itself can be minimized.

The respective amounts of wear of each of the components of the wear reduction kit (e.g., inserts, seals, blocks, covers, liners, stops, strips, rings, caps, tubes, collars, strips, etc.) at interfaces of the turbine system and other turbine system components are evaluated during inspections by field technicians. In particular, the field technicians may quantifiably measure the amounts of wear (in mils for example) or determine a qualitative wear range category (e.g., high wear, medium wear or light wear) of each of the wear reduction kit components. Data reflecting the wear measurements or wear category determinations is typically recorded by field technicians in individual spreadsheets. These spreadsheets, however, lack the capability to provide centralized access to the collection of data. Technicians who did not perform the wear measurements or wear category determinations would therefore not have prompt access to this and other inspection information. Moreover, the spreadsheets do not prompt the field technicians to enter consistent inputs over numerous inspections. There has thus been no formalized process for consistently capturing and effectively processing inspection information including wear related data made by field technicians.

Accordingly, there remains a need in the art to efficiently process information relating to the wear of turbine system components including efficiently receiving, managing, monitoring, sorting, searching and displaying data. In particular, there remains a need to provide centralized access to a database of information relating to the wear of turbine system components such as a combustion system's wear reduction kit components. It would therefore be beneficial to enable wear related information to be accessed by and presented in an interactive, easy-to-read interface to enable users to enter, review, sort, edit, update, search, output and/or report the information in an efficient manner and to use the data for various calculations and evaluations. It would also be beneficial to prompt field technicians or other users to enter inspection data such as wear-related data in a consistent manner.

SUMMARY OF INVENTION

In an exemplary embodiment of the invention, a method comprises storing data relating to wear of a component of at least one turbine system in a database of a system for processing wear related information, generating a displayable menu for an interface containing a plurality of user-selectable links respectively associated with software modules of the system, and receiving an on-line selection through the interface of one of the user-selectable links to enable the associated software module of the system to generate displayable content including information relating to the wear of the component of the turbine system.

The module associated with the selected link may enable a quantitative amount of the wear of the component to be input and received on-line. The module associated with the selected link may enable a qualitative wear range characterizing the amount of the wear of the component to be input and received on-line. The module associated with the selected link may enable a component type to be input and received on-line and display a component fleet leader corresponding to the received component type using data stored in the database. The module associated with the selected link may enable the displayable content to depict, on-line, an example component having a standardized level of wear. The module associated with the selected link may enable a search criterion to be input and received on-line and retrieve data from the database based on the received search criterion. The wear of the component of the at least one turbine system may comprise the wear of a material in one of following turbine components: transition piece body assembly component, bull horn cover, side seal, AFT frame creep, combustion liner assembly component, flow sleeve, cross fire tube and fuel nozzle.

In an on line wear monitoring system of another exemplary embodiment of the invention, a method of identifying a component fleet leader from among a plurality of a same type of components in respective turbine systems comprises: processing an on-line user selection of a component type of the turbine system, searching a database of the on-line system based on the on-line user selection, and processing information retrieved from the database as a result of the search including identifying that component from among the plurality of components corresponding to the user-selected component type which has been in operation in its respective turbine system for the longest cumulative time as the component fleet leader. The selected component type may be one of the following turbine component types: transition piece body assembly component, bull horn cover, side seal, AFT frame creep, combustion liner assembly component, flow sleeve, cross fire tube and fuel nozzle.

In another embodiment of the invention, a method of processing information relating to wear of a component of a turbine system comprises: receiving an on-line user selection of a user-selectable link on a menu, the link being associated with a software module for generating a depiction of an example component of the turbine system having a standardized level of wear, generating displayable content depicting the example component having the standardized level of wear based on the received on-line user selection of the user-selectable link, receiving an on-line user selection of another user-selectable link on the menu, the another usable link being associated with another software module for enabling input of information relating to the wear of the component of the turbine system to be received, and generating displayable content to enable input of the information indicating the wear of the component of the turbine system to be received based on the received on-line user selection of the another user-selectable link, the information received indicating the wear of the component being relative to the example component having the standardized level of wear. The information received indicating the wear of the component may be a quantitative measure of the amount of the wear or a qualitative wear range characterizing the amount of the wear.

BRIEF DESCRIPTION OF DRAWINGS

FIG. 10 is an exemplary screen display of the web page resulting from input of a particular turbine serial number in the window of the web page illustrated in FIG. 6 and selection of the button Continue in the web page illustrated in FIG. 6;

FIG. 11 is an exemplary screen display of the web page resulting from the selection of the button Liner Assembly in the web page illustrated, for example, in FIG. 10, or the selection of an instance of the term Liner Assembly in the web page illustrated in FIG. 9;

FIG. 12 is an exemplary screen display of the web page resulting from the selection of the button Fuel Nozzle Assembly in the web page illustrated, for example, in FIG. 10, or the selection of an instance of the term Fuel Nozzle Assembly in the web page illustrated in FIG. 9;

FIG. 15 is an exemplary screen display of the web page resulting from data entry and selection of the button Search in the web page illustrated in FIG. 14;

FIG. 17 is an exemplary screen display of the web page resulting from data entry and selection of the button Search in the web page illustrated in FIG. 16;

DETAILED DESCRIPTION

Figure 1A:
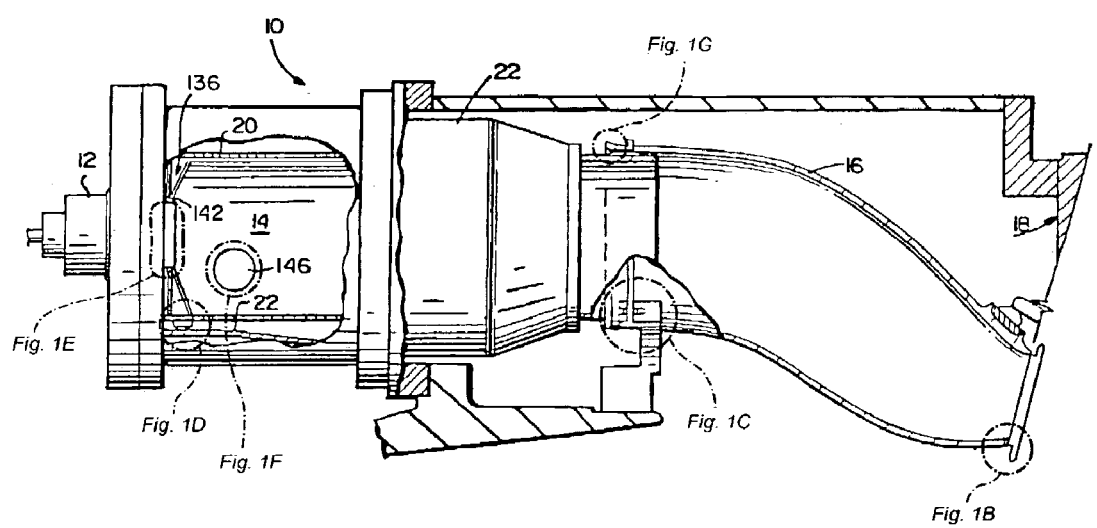
FIG. 1A is a side elevation, partly in section, illustrating a combustor (i.e., a combustion system) of a gas turbine system including various interfaces having wear reduction kit components.
Figure 1B:
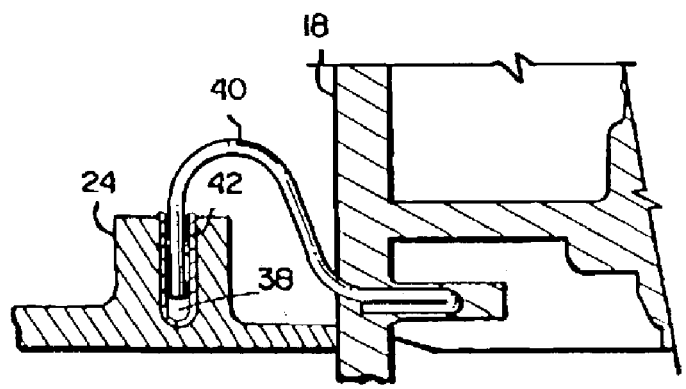
FIG. 1B is a detailed view of a portion of the turbine system illustrated in FIG. 1A showing, for example, U-shaped wear inserts and seals for a transition piece of the turbine system.
Figure 1C:
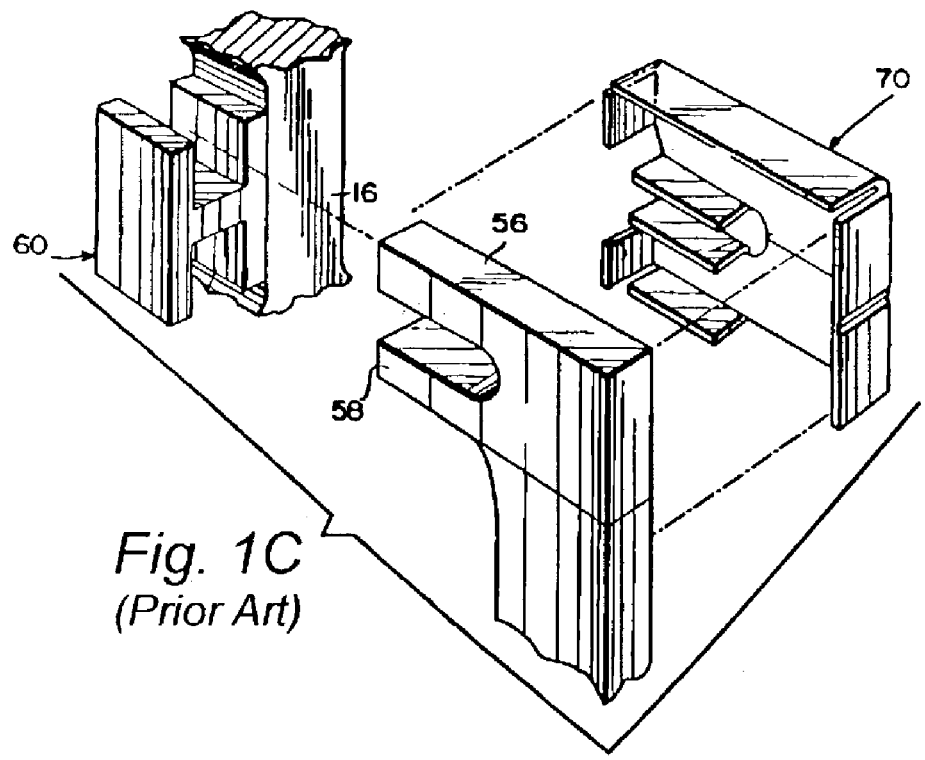
FIG. 1C is a detailed view of a portion of the turbine system illustrated in FIG. A showing, for example, bullhorn guide finger covers at the interface between H-shaped guide blocks and bullhorn guide fingers.
Figure 1D:
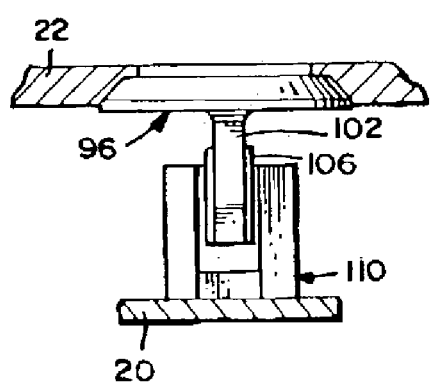
FIG. 1D is a detailed view of a portion of the turbine system illustrated in FIG. 1A showing, for example, a flow sleeve stop having a wear strip and a liner stop.
Figure 1E:
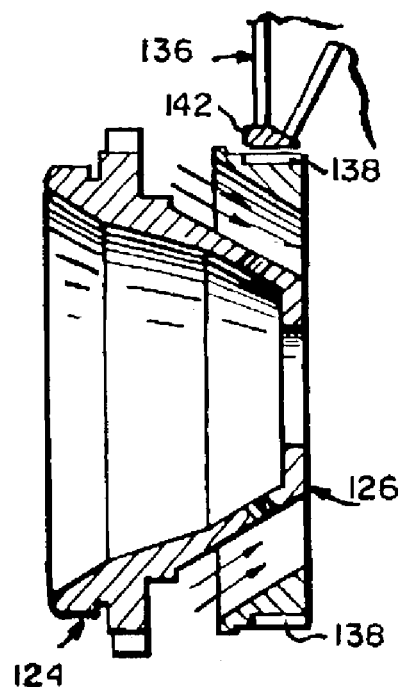
FIG. 1E is a detailed view of a portion of the turbine system illustrated in FIG. 1A showing, for example, a weld deposit material on a fuel nozzle and a mounting ring of a combustion liner cap assembly.
Figure 1F:
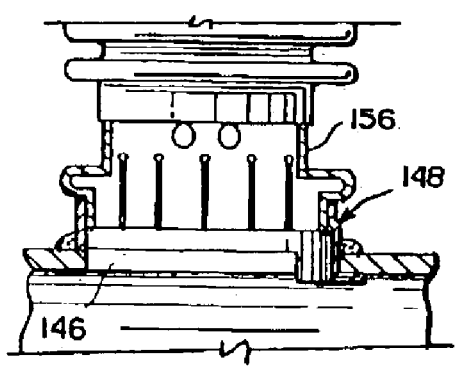
FIG. 1F is a detailed view of a portion of the turbine system illustrated in FIG. 1A showing, for example, an interface of a cross fire tube and a cross tube collar.
Figure 1G:
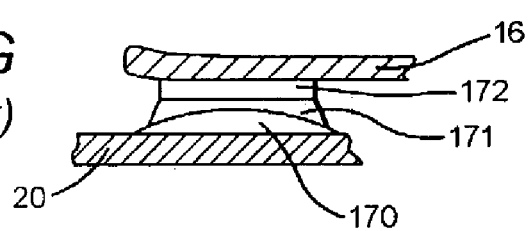
FIG. 1G is a detailed view of a portion of the turbine system illustrated in FIG. 1A showing, for example, wear strips coupled to a hula seal which is arranged between a transition piece and a combustion liner.
Figure 2:
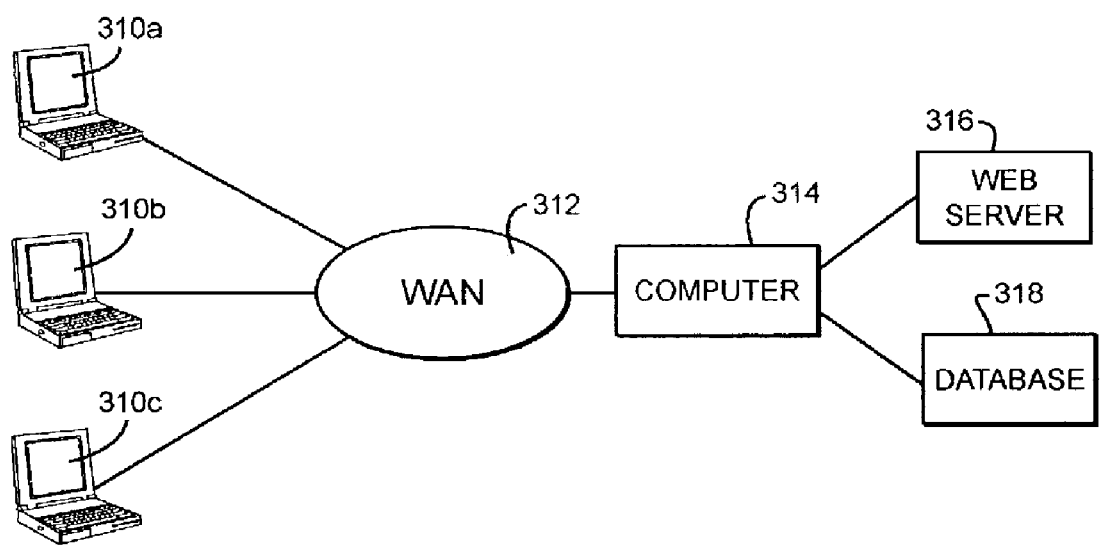
FIG. 2 is a block diagram showing a web-based, on-line, system for processing wear-related information in accordance with an exemplary embodiment of the present invention.

FIG. 2 is a block diagram of an exemplary internet-based computer system for processing field inspection information such as wear-related data (hereinafter wear data processing system) in accordance with an exemplary embodiment of the present invention. The computer system includes personal computers (PCs) 310a–310c interconnected via a wide area network (WAN) 312 such as the internet. PCs 310a–310c are operated by users such as turbine field technicians. PCs 310a–310c communicate on-line via WAN 312 with web server 316. In particular, on-line requests from PCs 310a–310c are routed through WAN 312 to web server 316. Alternatively, PCs 310a–310c may route a request through a local area network (LAN) rather than a WAN. A web server application is executed on computer 314. Computer 314 may be, for example, a main frame computer which executes many application programs including the web server application. The web server application executed by computer 314 may thus communicate with web browsers executing at PCs 310a–310c using conventional HTTP protocol. Computer 314 also retrieves and/or stores data in database 318.

Figure 3:
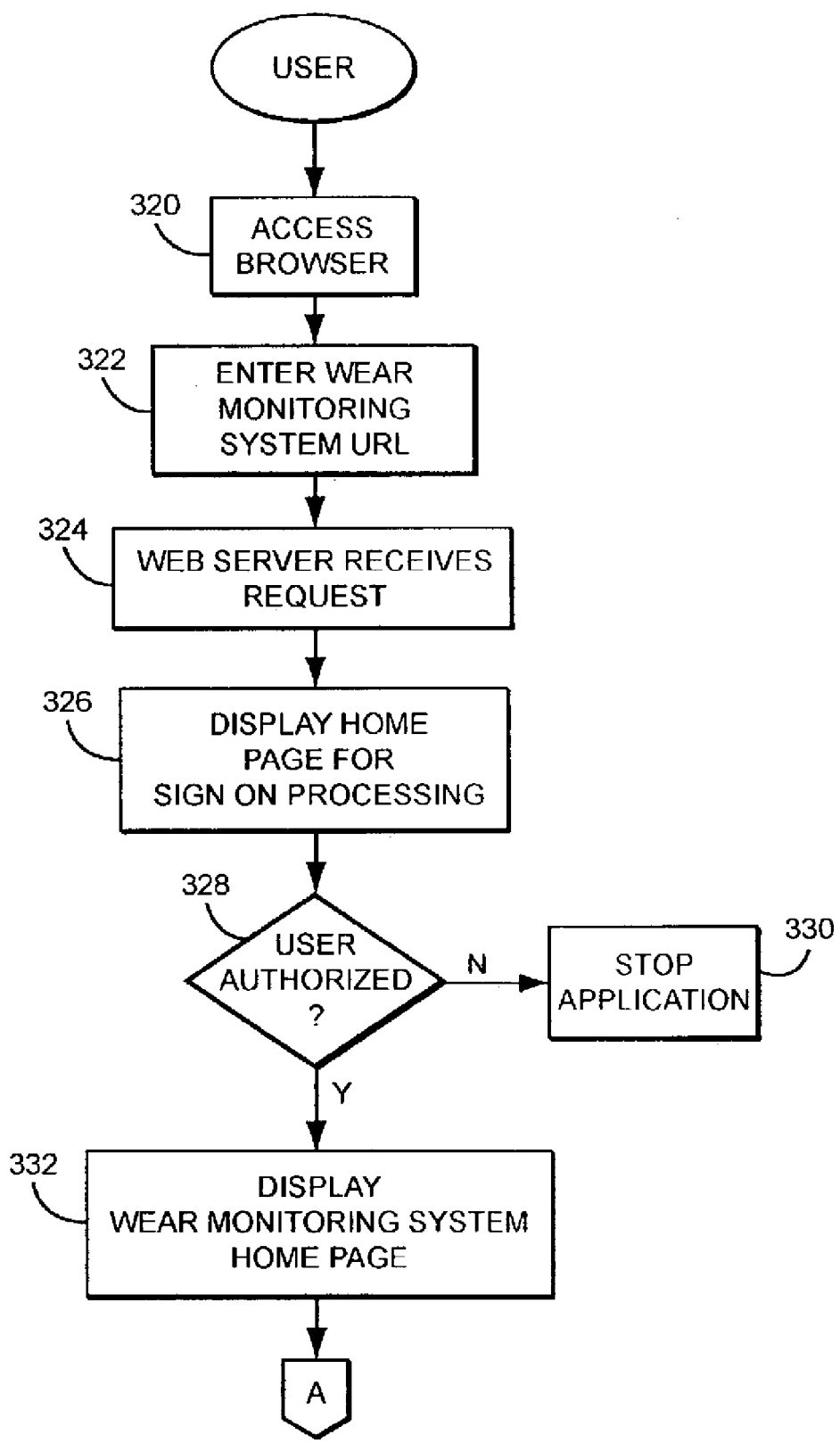
FIG. 3 is a flow chart showing initial processing operations which occur when a user accesses the wear processing system.

FIG. 3 is a flowchart showing exemplary initial processing operations of the wear data processing system. A user first accesses an internet browser, such as Netscape® or Microsoft Internet Explorer® using one of PCs 310a–310c (step 320). Using the internet browser, a user enters a wear data processing system uniform resource locator (URL) (step 322). This URL is received by web server 316 via WAN 312 (step 324). A home web page (see FIG. 5) is then generated by computer 314 and server 316 for display on the PC originally transmitting the URL (step 326). The home web page enables sign-on processing. In particular, the user is prompted to enter his/her login id and password. If the user is not an authorized user (NO in step 328), the server application is stopped (step 330). If, however, the user is an authorized user (Yes in step 328), the computer 314 and web server 316 enable access to software modules of the wear data processing system.

Figure 5:
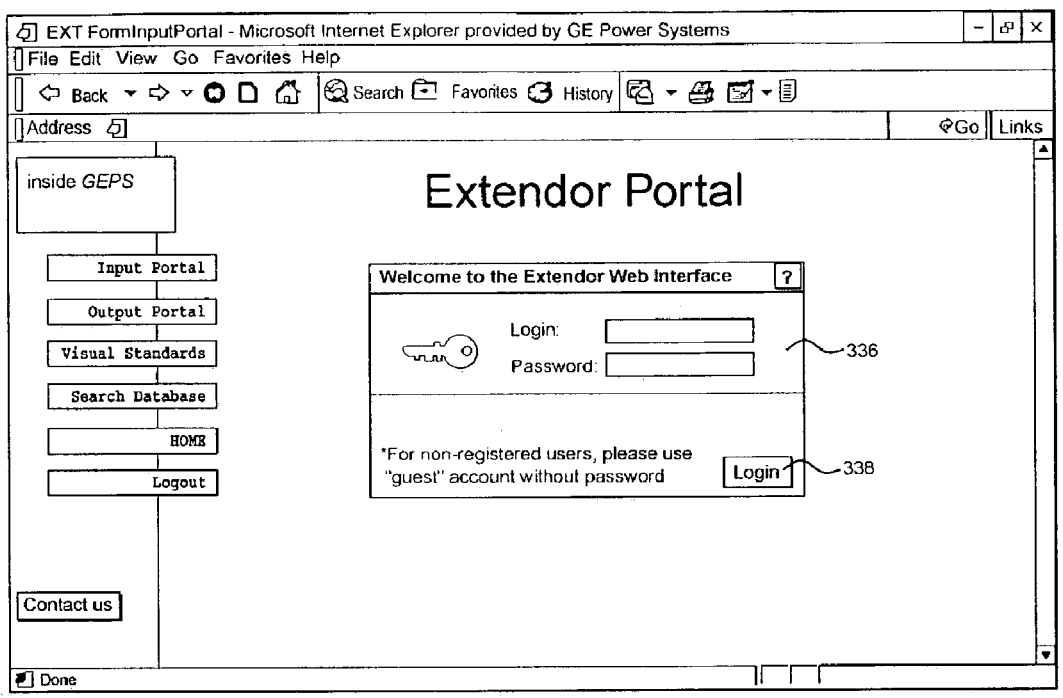
FIG. 5 is an exemplary screen display of the web page resulting from the selection of the link HOME from the navigation pane of the system of the present invention.

Each web page generated and displayed by the wear data processing system, except the home web page illustrated in FIG. 5, includes a navigation pane 350 located on the left-side of the web page (see FIGS. 6–20). The contents of the left-side navigation pane 350 essentially form a menu which includes links that allow the user to click-on or select the type of software module of the system he or she wishes to execute. Some of the web pages also include various buttons and/or input screens to allow the user to control the type of wear-related data that he or she can input, review, edit, sort, search, etc.

Figure 4:
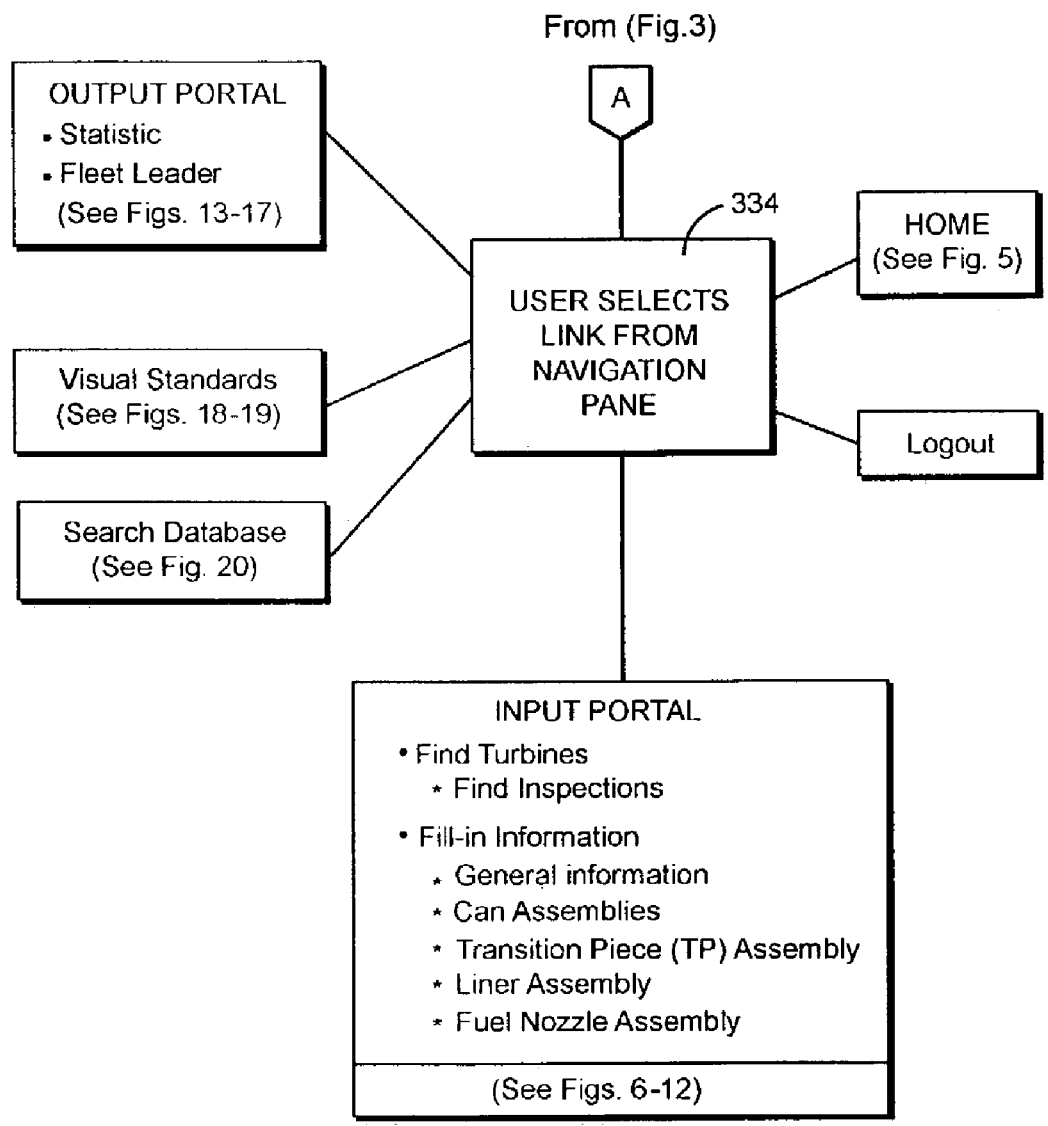
FIG. 4 is a flow chart showing possible operations performed when a user selects a main link from a navigation pane presented to a user in accordance with an exemplary embodiment of the present invention.

Referring to FIGS. 4–20, while a web page is currently being displayed on a user's PC 310a–310c, the user may select another link from navigation pane 350. In particular, the user may select one of the following links from navigation pane 350 (step 334) in FIG. 4: HOME—see FIGS. 4 and 5, Input Portal—see FIGS. 4 and 6–12, Output Portal—see FIGS. 4 and 13–17, Visual Standards—see FIGS. 4 and 18–19, Search Database—see FIGS. 4 and 20, and Logout—see FIG. 4. The user may alternatively select the same link corresponding to the web page that is being currently displayed to refresh the screen.

By selecting the appropriate link on navigation pane 350, a user of the wear data processing system may input inspection data such as data relating to the wear of components of a turbine system. In particular, a user (e.g., a field technician) may enter data relating to the wear (e.g., a quantitative measure or a qualitative wear range) of wear reduction kit components of a turbine system. The wear of other components of the turbine system may also be entered. By selecting the appropriate link on navigation pane 350, a user of the wear data processing system may also review data previously input, edit any data, statistically sort data, identify a fleet leader of a particular turbine system component, obtain a visual standard of a particular level of wear of a certain component type and/or search the database for information relating to a particular component. A description of displayed web pages corresponding respectively to each of the links provided in navigation pane 350 is provided below in conjunction with FIGS. 5–20.

As illustrated in FIG. 5, if a user selects the link HOME from navigation pane 350, a home web page of the system will be generated and displayed. The home web page allows the user to enter his/her appropriate login id and password in data entry window 336. For non-registered users, the system allows a guest account to be enabled through selection of Login button 338.

Figure 6:
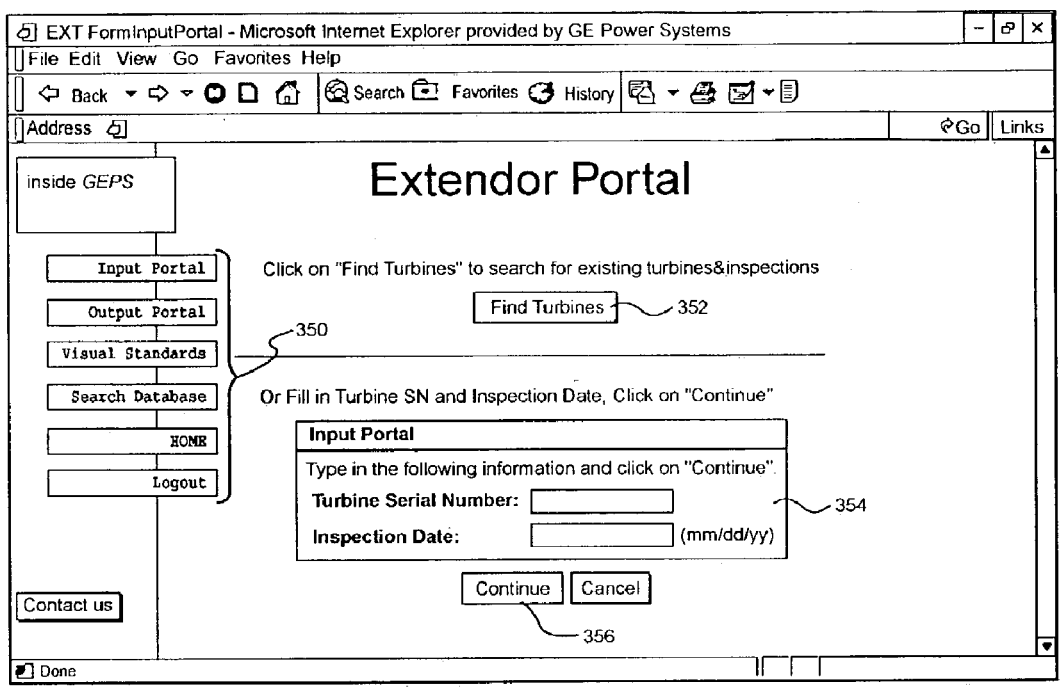
FIG. 6 is an exemplary screen display of the web page resulting from the selection of the link Input Portal from the navigation pane of the system in accordance with an exemplary embodiment of the present invention.

FIG. 6 illustrates an exemplary web page generated by the system resulting from a user selection of the link Input Portal from navigation pane 350. As illustrated in the web page of FIG. 6, the user has the option of selecting a Find Turbines button 352 to search for existing turbine inspection data or to provide a turbine serial number and inspection date in window 354 to enter new data into the wear data processing system. This newly entered data may relate to, for example, the amount of wear on any of the components of the turbine system such as wear reduction kit components that was determined by a technician during a new field inspection. After entering the turbine serial number and inspection date in window 354, the user may click-on the Continue button 356.

Figure 7:
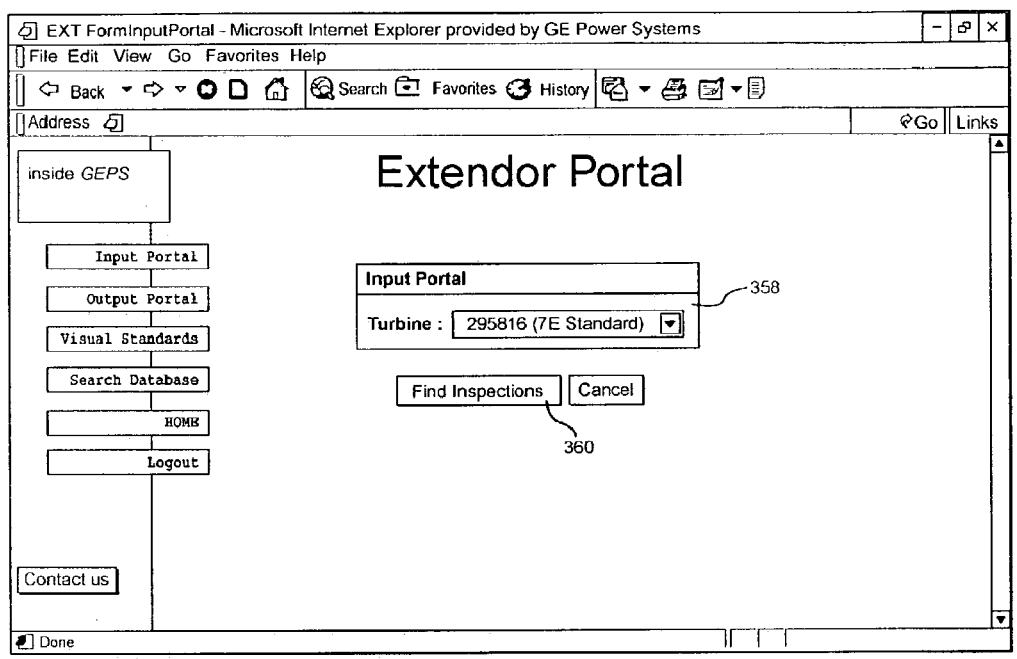
FIG. 7 is an exemplary screen display of the web page resulting from the selection of the button Find Turbines from the web page illustrated in FIG. 6.

FIG. 7 illustrates an exemplary web page generated by the system resulting from the selection of the Find Turbines button 352 in the web page illustrated in FIG. 6. As illustrated in FIG. 7, a window 358 having a drop down select box allows the user to select one of the turbines for which data has been previously entered in the wear data processing system. In particular, a user may select a specific turbine serial number (295816 (7E Standard) in the example illustrated in FIG. 7) using the drop down select box in window 358 and then click on the Find Inspections button 360.

Figure 8:
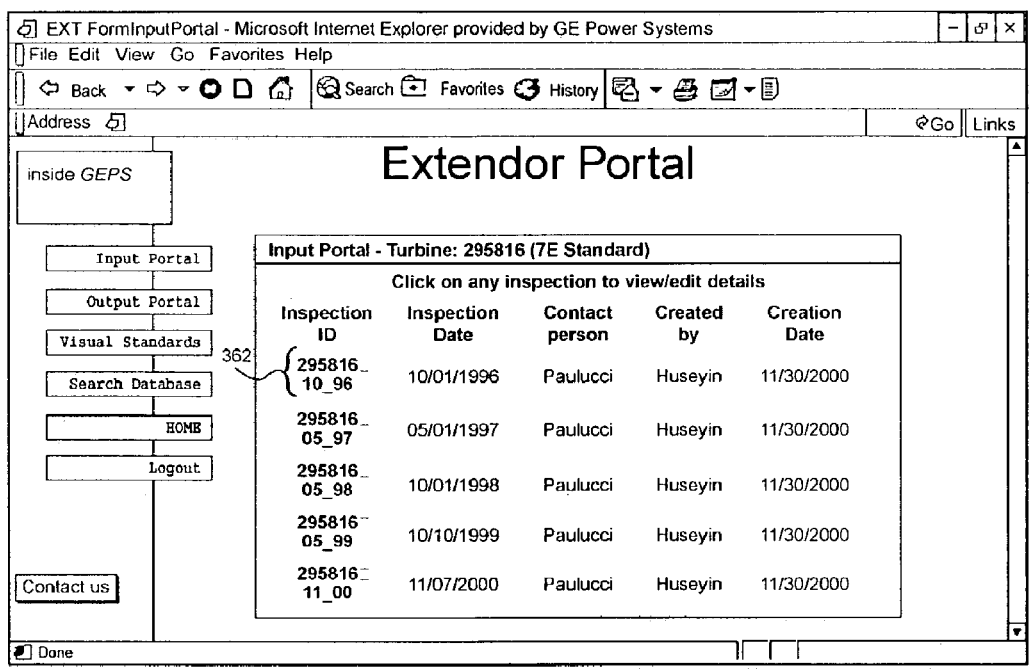
FIG. 8 is an exemplary screen display of the web page resulting from data entry and selection of the button Find Inspections from the web page illustrated in FIG. 7.

FIG. 8 illustrates an exemplary web page generated by the system resulting from the input of a particular turbine serial number in window 358 and selection of the Find Inspections button 360 in the web page illustrated in FIG. 7. As can be seen in FIG. 8, an inspection report for the particular turbine identified in the web page of FIG. 7 is displayed on the user's PC. The inspection report includes (from left to right in the inspection report) the inspection id formed by a turbine serial number and month and year of inspection, the inspection date, a name of a contact person, a name of the person who created the information relating to that inspection, and the creation date. Upon viewing the inspection report, a user may click on any particular inspection to view and/or edit its details. For example, the first row 362 having inspection id 295816 10_96 can be selected by the user to view and/or edit the details of this particular inspection.

Figure 9:
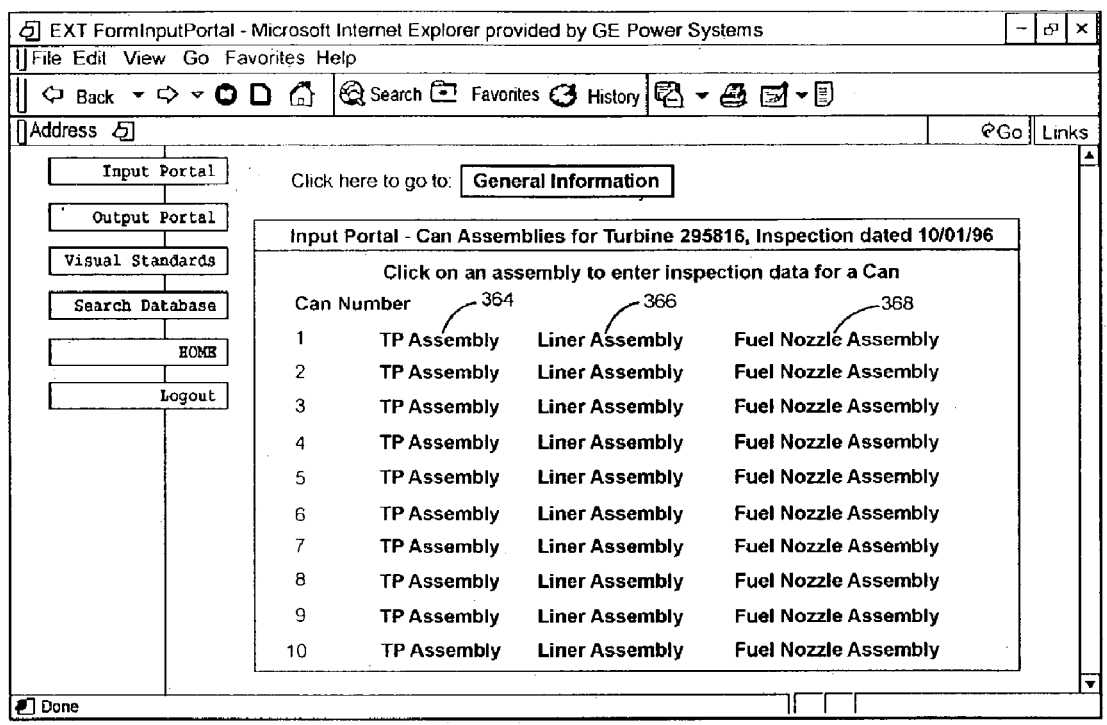
FIG. 9 is an exemplary screen display of the web page resulting from the selection of a particular inspection in the window of the web page illustrated in FIG. 8.

FIG. 9 is an exemplary web page generated by the system resulting from the selection of one of the rows of the inspection report illustrated in the web page of FIG. 8. In this particular example, the user has selected the first row 362 of the inspection report having inspection id 295816 10_96. The web page illustrated in FIG. 9 provides a list of can assemblies for the selected turbine (i.e., the turbine associated with the selected row of the inspection report). For example, the list provided in the web page of FIG. 9 indicates ten cans having respective can numbers 1–10. Each of the cans has a transition piece (TP) assembly, a liner assembly and a fuel nozzle assembly as indicated by the columns (from left to right) on the web page. A user may click on one of the assemblies of one of the cans in order to view and/or edit detailed information for that particular can assembly of the selected turbine. For example, a user may select TP Assembly 364 or Liner Assembly 366 or Fuel Nozzle Assembly 368 of can number 1 from the first row of data presented in the web page of FIG. 9.

FIG. 10 is an exemplary web page resulting from the user's selection of the term TP Assembly 364 from the web page illustrated in FIG. 9. As can be seen in FIG. 10, the user may view and/or edit inspection data such as wear data of turbine system components which relate specifically to an inspection of the transition piece (TP) assembly of can number 1 of the turbine having serial no. 295816. All of the entered data may be stored in database 318. After the data is stored, centralized access to this data is available to other users via computer 314 and server 316.

In column 370, the user may view and/or edit the Quantitative Wear of various transition piece assembly components of can number 1 of the turbine system. Specifically, a user may view and/or edit the amount of Quantitative Wear of one or more of the following components of transition piece body assembly: H block, forward (FWD) inner portion of the transition piece body, outer floating seal, inner floating seal, aft frame in mils, and thermal barrier coating (TBC) in sq. ins. The TBC may be a thermal protective ceramic coating applied to high temperature components for reducing thermal stress. In the lower portion of column 370, a user may also view and/or edit the amount of Quantitative Wear in mils of the following additional transition piece assembly components: Bull Horn Cover, Side Seal, Aft Frame Creep (Left), Aft Frame Creep (Center) and Aft Frame Creep (Right). Aft refers to the rear end and Aft Frame Creep refers to deformation of the rear end of the transition piece via a mechanical strain process referred to as creep. The amount of Quantitative Wear may be measured by a field technician through the use of, for example, a micrometer.

During an inspection, a field engineer must typically examine the wear of many components of the turbine system. The field engineer may thus not have the time to quantitatively measure the amount of wear for each of these turbine system components. Rather than determine a quantitative measure of the wear of each of these components, a field technician may determine the Wear Range (light amount of wear, medium amount of wear or heavy amount of wear) of each of the turbine system components. The wear range of components of the transition piece assembly may be reviewed and/or edited by a user (e.g., field engineer) in column 372. For example, the H Block, Outer Floating Seal and Inner Floating Seal of can number 1 of the TP body assembly were entered as having a light amount of wear during the Oct. 1, 1996 inspection of turbine no. 295816. The wear range of the Side Seal was entered as having a medium amount of wear as can be seen in the lower portion of column 372. Each of the Wear Ranges of the components of the transition piece assembly may be viewed and revised using the appropriate drop down box in Wear Range column 372.

There are several components of the turbine system which must be replaced after experiencing a certain amount of wear. For example, the transition piece body assembly, bull horn cover and the side seal of the transition piece assembly must be replaced after a certain amount of wear. In column 374 of the web page illustrated in FIG. 10, a user may indicate whether or not the TP Body Assembly, Bull Horn Cover and/or Side Seals have been replaced. For example, the web page illustrated in FIG. 10 indicates that the TP Body Assembly and the Bull Horn Cover have not been replaced, whereas the Side Seal has been replaced.

During an inspection, a field engineer may obtain a picture (e.g., take a digital photograph) of a particular component of the turbine system. For example, the field engineer may photograph any portion of the TP Body Assembly, Bull Horn Cover, Side Seal and Aft Frame Creep. This picture may be uploaded through the selection of column 376 in the web page illustrated in FIG. 10. After the picture has been uploaded, a user may select an appropriate row in column 376 to view the picture of that particular component.

A serial number of a particular component of the TP body assembly may be entered and stored in database 318. A user may review and/or edit the serial number through appropriate data entry in column 378.

General Information button 379, Can Assemblies button 380, Liner Assembly (Can 1) button 382 and Fuel Nozzle Assembly (Can 1) button 384 or Next Can button 386 presented in the upper portion of the web page illustrated in FIG. 10 allow the user to efficiently select the next page for viewing. For example, if the user next wished to view and/or edit inspection data of components of the combustion liner assembly for can number 1 of the turbine system, the user may select button 382. Alternatively, the user may accomplish the same by clicking on the term Liner Assembly 366 in the web page illustrated in FIG. 9. If the user next wished to view and/or edit inspection data of components of the Fuel Nozzle Assembly of can number 1, he/she may select button 384 in the web page illustrated in FIG. 10. Alternatively, the user may click on the term Fuel Nozzle Assembly 368 in the web page illustrated in FIG. 9. If the user would like to view inspection data relating to can number 2, he or she can select the Next Can button 386 or the Can Assemblies button 380 in the web page illustrated in FIG. 10.

Selection of the Can Assemblies button 380 may also allow the user to view data relating to other cans (e.g., any one of can numbers 3–10). Viewing data relating to another can number may also be selected by selecting the appropriate can number in the web page illustrated in FIG. 9.

Figure 11:
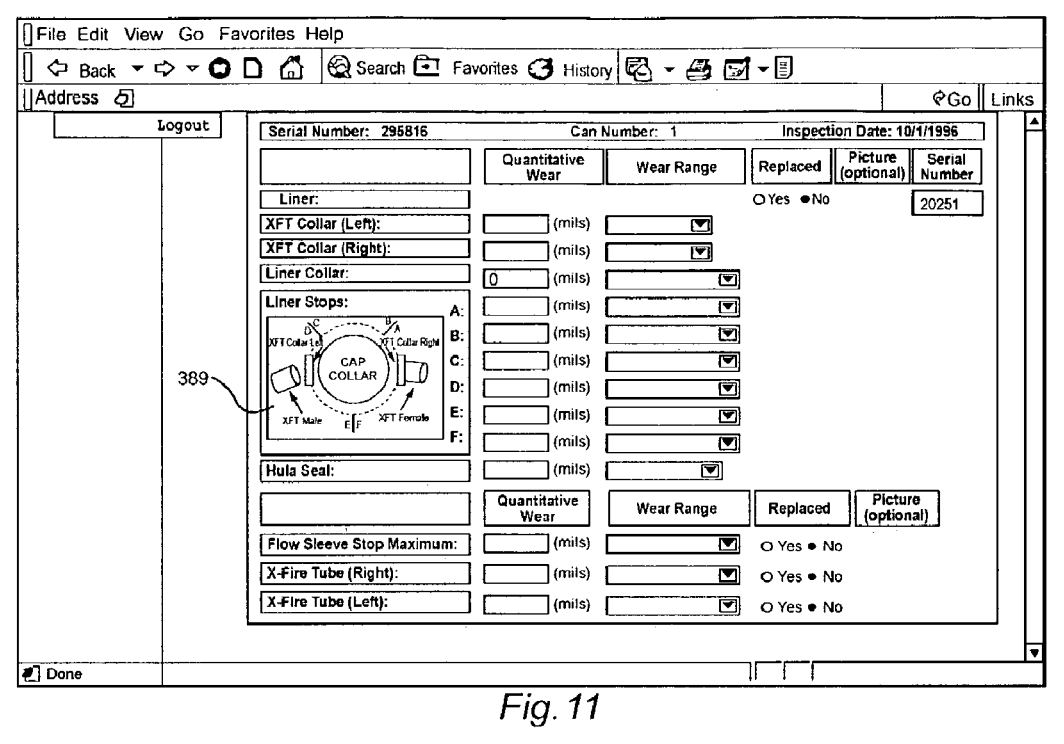

FIG. 11 discloses a web page resulting from the selection of Liner Assembly (can 1) button 382 in the web page illustrated in FIG. 10 or the selection of the term Liner Assembly 366 in the web page illustrated in FIG. 9. The web page illustrated in FIG. 11 includes the same columns as columns 370–378 illustrated in the web page of FIG. 10. A user may thus enter the quantitative amount of wear or a qualitative wear range characterizing the amount of wear in the columns labeled Quantitative Wear and Wear Range for the following components of the combustion liner of can number 1 of the turbine having serial no. 295816: XFT Collar (Left), XFT Collar (Right), Liner Collar, Liner Stops and Hula Seal. As can be seen in the lower rows of the Quantitative Wear and Wear Range columns, the user may also view and/or edit the quantitative amount of wear or qualitative wear range for the following turbine system components: Flow Sleeve Stop Maximum, X-Fire Tube (Right) and X-Fire Tube (Left). A picture of the cross-fire tube (XFT or X-Fire tube) collar, cross-fire tube and liner stops A–F is provided in window portion 389 to aid the user to identify the appropriate component part.

In the Replaced column, a user may view and/or edit whether the Liner, Flow Sleeve Stop Maximum, X-Fire Tube (Right) and/or X-Fire Tube (Left) have been replaced. In the Picture (optional) column, a picture (e.g., digital photograph) of any component of or associated with the combustion liner may be viewed or uploaded. In the Serial Number column, a serial number of the combustion liner may be viewed and/or edited.

While not explicitly illustrated, the web page illustrated in FIG. 11 may include Can Assemblies, TP Assembly (can 1), Fuel Nozzle Assembly (Can 1) and Next Can buttons to allow the user to efficiently select the next web page for viewing.

Figure 12:
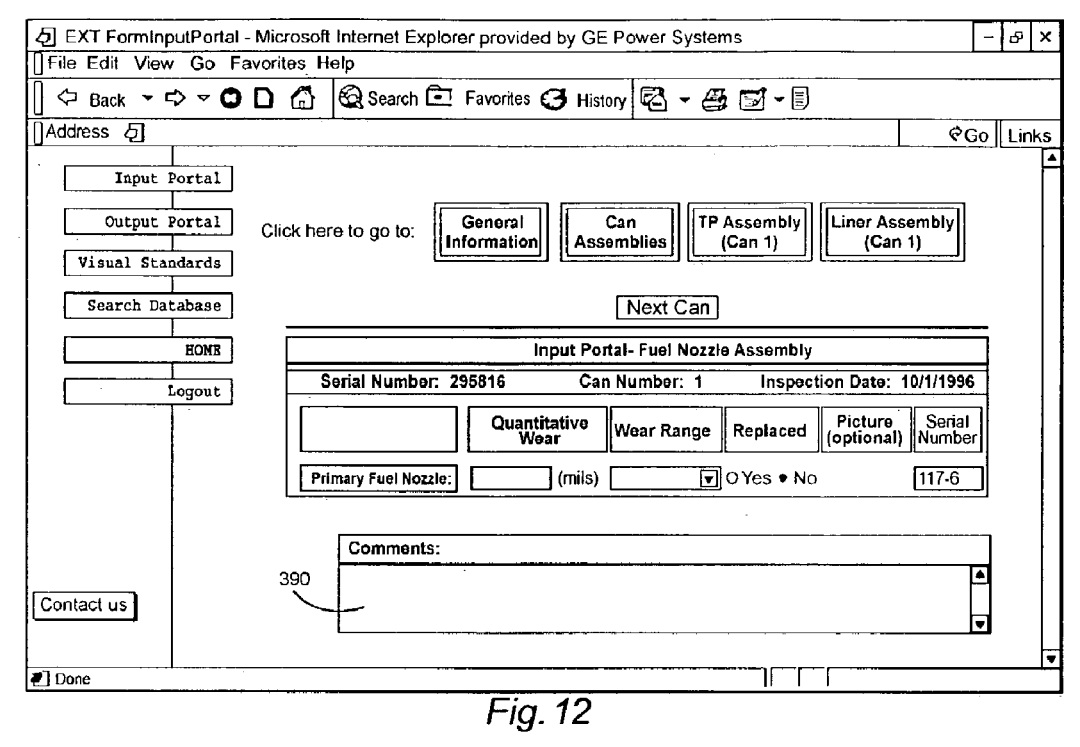

FIG. 12 illustrates the web page resulting from the selection of the term Fuel Nozzle Assembly 368 in the web page illustrated in FIG. 9 or the Fuel Nozzle Assembly (Can 1) button 384 in the web page illustrated in FIG. 10 (or FIG. 11). As can be seen in the web page illustrated in FIG. 12, a user may view and/or edit inspection data relating to the Fuel Nozzle Assembly of any can of the turbine system. The columns Quantitative Wear, Wear Range, Replaced, Picture (optional) and Serial Number are similar to columns 370–378 illustrated in the web page of FIG. 10. A user may view and/or edit the amount of quantitative wear of the primary fuel nozzle or view and/or edit a qualitative wear range characterizing the amount of wear of the primary fuel nozzle in the Quantitative Wear and Wear Range columns, respectively. A user may also indicate whether the primary fuel nozzle has been replaced through the appropriate selection in the Replaced column. A picture may be viewed or uploaded through selection of the Picture (optional) column. A serial number of the primary fuel nozzle may also be viewed and/or edited in the Serial Number column. Comments regarding the fuel nozzle assembly may be entered in window 390. For example, any comments regarding the wear of the fuel nozzle may be viewed and/or edited in window 390. Rather then allowing a user to edit data in the web page illustrated in FIG. 12, access can be limited to viewing only.

Similar to the discussion above in connection with FIGS. 10 and 11, one of the General Information, Can Assemblies, TP Assembly (Can 1), Liner Assembly (Can 1) or Next Can buttons located in the upper portion of the web page illustrated in FIG. 12 may be clicked on by the user to select the next page for viewing.

Turning back to FIG. 6, new inspection data for a particular turbine can be entered by providing a turbine serial number and inspection date in window 354 and selecting the Continue button 356. After the Continue button is selected, web pages such as those illustrated in FIGS. 9–12 will be displayed to enable the user to input data relating to the inspection. These web pages prompt users to enter inspection data in a consistent manner. For example, different users are prompted to newly enter, data relating to the Quantitative Wear or Wear Range of the transitional piece assembly, combustion liner and/or fuel nozzle assembly in a consistent manner. This data will be stored in database 318 and processed by the wear data processing system. The data can be immediately viewed by other users having access to the wear data processing system.

Figure 13:
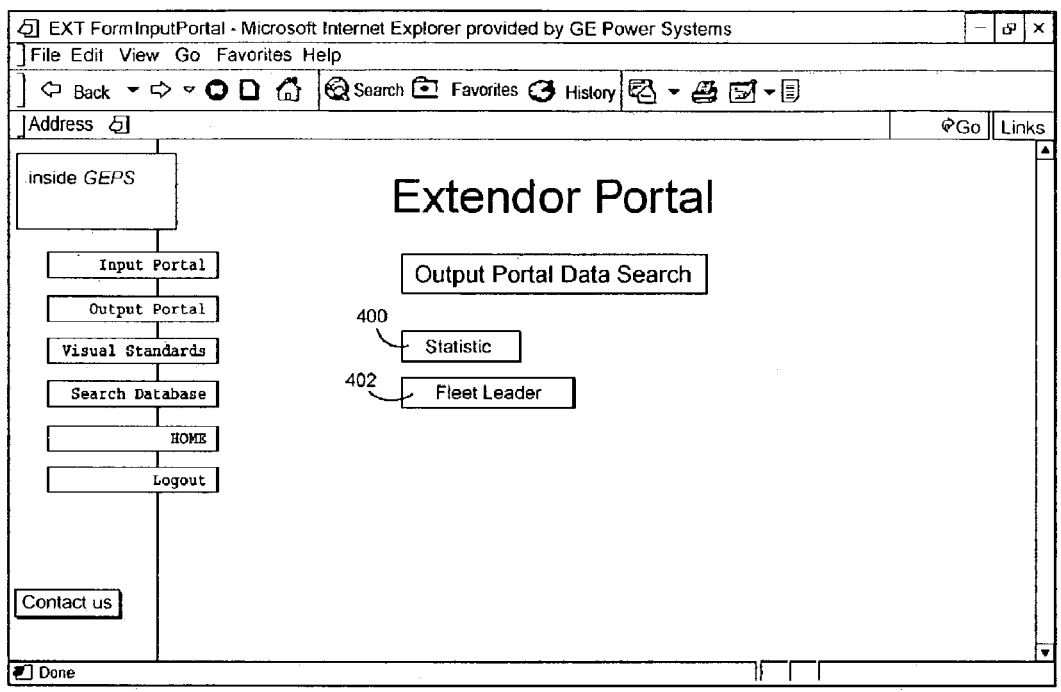
FIG. 13 is an exemplary screen display of the web page resulting from the selection of the link Output Portal in the navigation pane of the system in accordance with an exemplary embodiment of the present invention.

FIG. 13 illustrates an exemplary web page resulting from the selection of the link Output Portal in navigation pane 350. As can be seen in the web page illustrated in FIG. 13, upon the selection of the Output Portal link, a user is prompted to select either the Statistic button 400 or the Fleet Leader button 402. By selecting the Statistic button 400, a user may perform a statistical sorting of existing inspection data including wear-related data. By selecting the Fleet Leader button 402, a user may view fleet leader units of the various types of turbine components.

Figure 14:
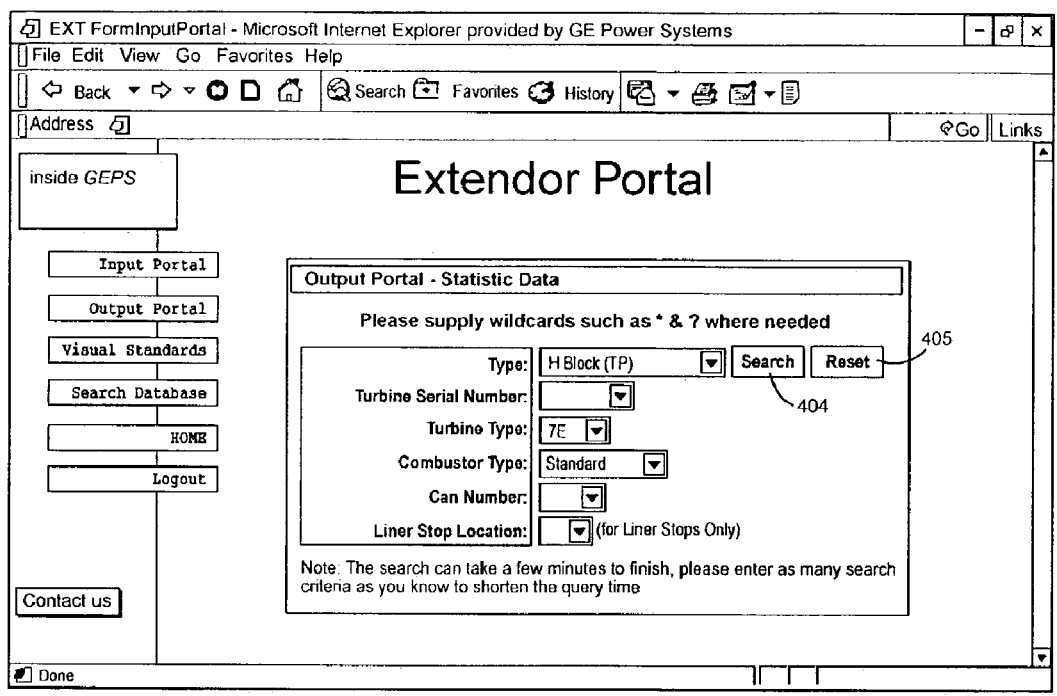
FIG. 14 is an exemplary screen display of the web page resulting from the selection of the button Statistic in the web page illustrated in FIG. 13.

FIG. 14 is an exemplary web page resulting from the selection of the Statistic button 400. As can be seen in the exemplary web page of FIG. 14, a user may enter search criteria as attributes for data sorting. Wild cards such as * and ? may be used by the user where needed. In particular, the user may enter one or more of the following as possible search criteria: the Type of turbine system component such as H Block (TP) as indicated in FIG. 14, Turbine Serial Number, Turbine Type such as 7E as illustrated in FIG. 14, Combustor Type such as Standard, Can Number and Liner Stop Location (for liner stops only). After entering in the appropriate search criteria, a user may click on search button 404 to view data retrieved and sorted on the basis of the search criteria. If the user makes a mistake in one or more of his/her search criteria entries, he/she may click on the Reset button 405 to clear all of the search criteria fields.

FIG. 15 is an exemplary web page resulting from the input search criteria and selection of search button 404 in the web page illustrated in FIG. 14. A user may thus efficiently view inspection data that has been sorted based on the search criteria input in the web page illustrated in FIG. 14. As can be seen in FIG. 15, one column of information for the selected component is Wear (third column from the right). A user may select WearPlot button 410 to view a graphical plot of the wear data.

Figure 16:
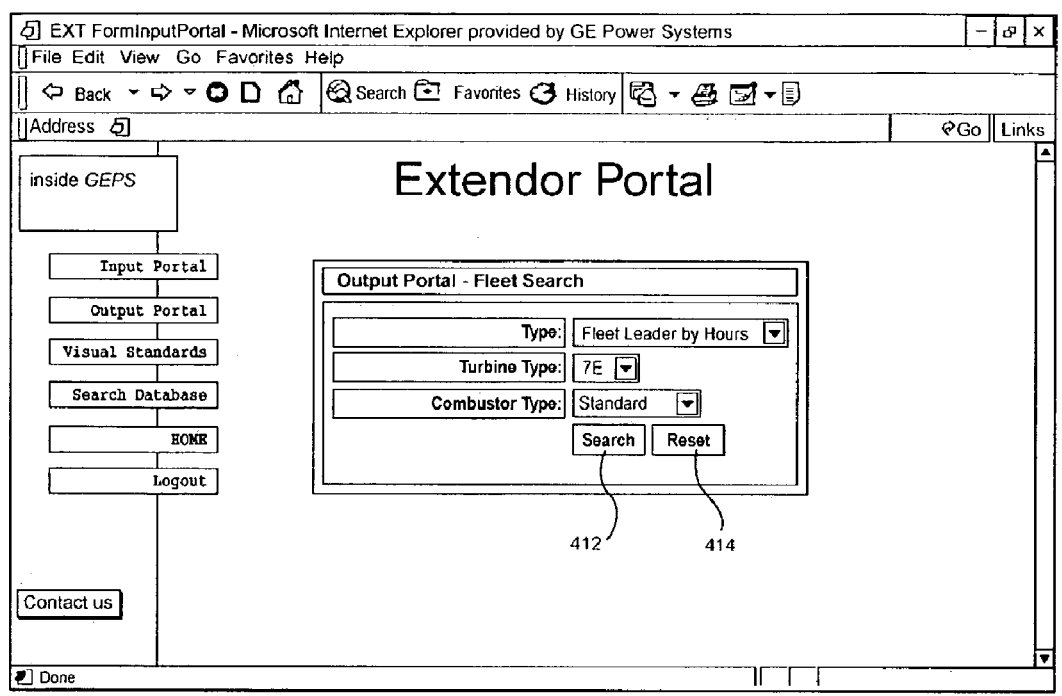
FIG. 16 is an exemplary screen display of the web page resulting from the selection of the button Fleet Leader in the web page illustrated in FIG. 13.

FIG. 16 is an exemplary web page generated by the system resulting from the selection of the Fleet Leader button 402 in the web page illustrated in FIG. 13. As can be seen in FIG. 16, the user may view an identified fleet leader through appropriate input of search criteria. A fleet leader of a particular turbine component is that component from amongst the same type of components installed at different turbines which has the most time in operation. By identifying the fleet leader, a user may determine which component of the various turbine installations is most likely to be in need of being replaced. Moreover, information regarding how long a particular component has lasted in operation may be used in marketing information.

As indicated in the web page of FIG. 16, a user may enter in the type of fleet leader such as Fleet Leader by Hours, a particular turbine type such as 7E and/or a certain combustor type such as Standard. Search button 412 may then be selected by the user to enable the fleet leader to be identified based on the input search criteria. The search criteria may be cleared through selection of reset button 414.

Figure 17:
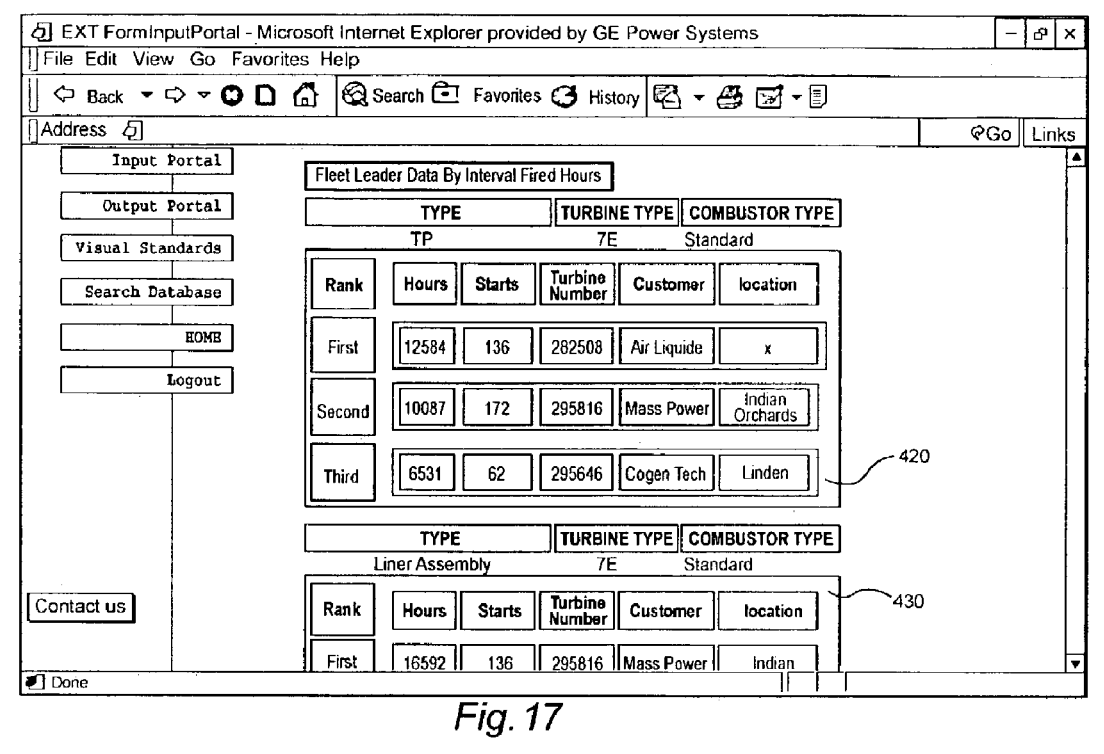

FIG. 17 is an exemplary web page illustrating the fleet leaders identified based on the search criteria entered in the web page illustrated in FIG. 16. As can be seen in FIG. 17, the identification of the fleet leaders involves a ranking of a particular type of turbine system component within various turbines. For example, as can be seen in the window 420, for a transition piece (TP) of a turbine type 7E and combustor type Standard, the transition piece installed in the turbine having number 282508 has the longest duration of cumulative operation. The transition piece installed in turbine having number 295816 has the second longest duration of cumulative operation as measured by the number of interval fired hours.

In window 430, the liner assembly component of turbine type 7E and combustor Standard that has the highest number of interval fire hours (i.e., the longest cumulative operation time as measured by interval fire hours) is the liner assembly installed in turbine number 295816.

Figure 18:
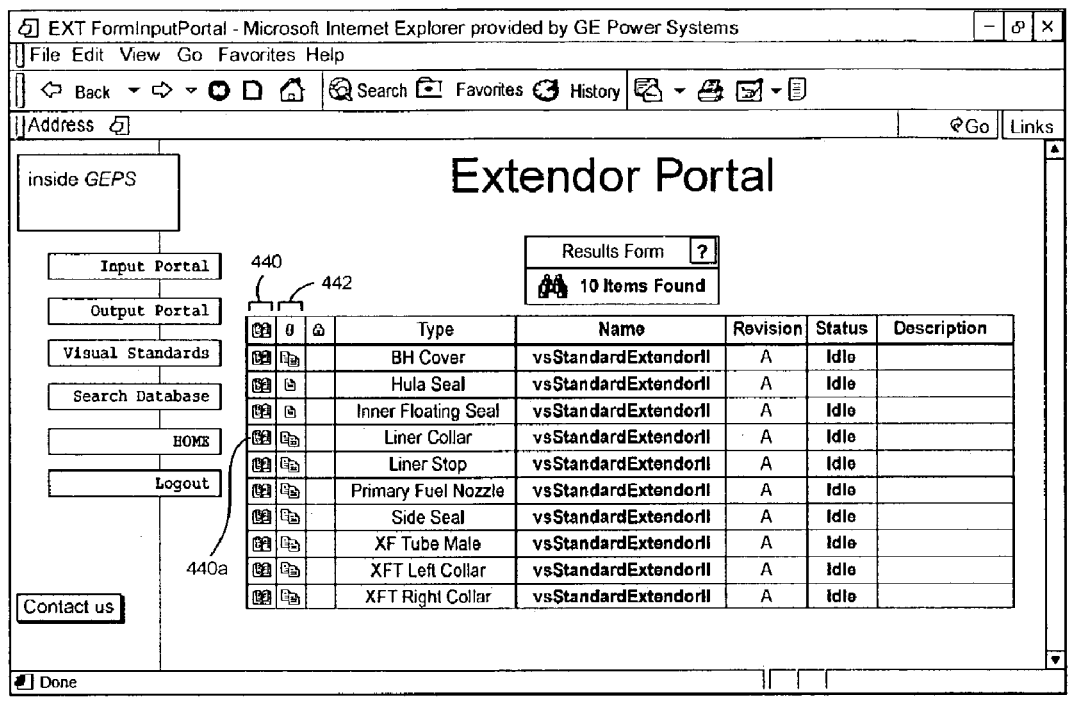
FIG. 18 is an exemplary screen display of the web page resulting from the selection of the link Visual Standards on the navigation pane of the system in accordance with an exemplary embodiment of the present invention.

FIG. 18 is an exemplary web page of the wear monitoring system resulting from the selection of the link Visual Standards from navigation pane 350. As discussed in detail in connection with FIGS. 10–12, a user may view and/or edit the Wear Range (e.g., light wear, medium wear or heavy wear). In entering this type of data, a field technician makes a qualitative determination of the amount of wear of a particular turbine system component. For example, the field technician may make a qualitative decision on the amount of wear on the following turbine system components: bull horn cover, hula seal, inner floating seal, liner collar, liner stop, fuel nozzle, side seal, XF tube male, XFT left collar, and XFT right collar.

In order to determine an accurate qualitative determination of the amount of wear, standards are necessary so that, for example, a light amount of wear can be distinguished from a medium amount of wear and a heavy amount of wear. Users viewing this data subsequent to its entry will also need to be aware of these standards so that they can correctly interpret this wear information.

Figure 19:
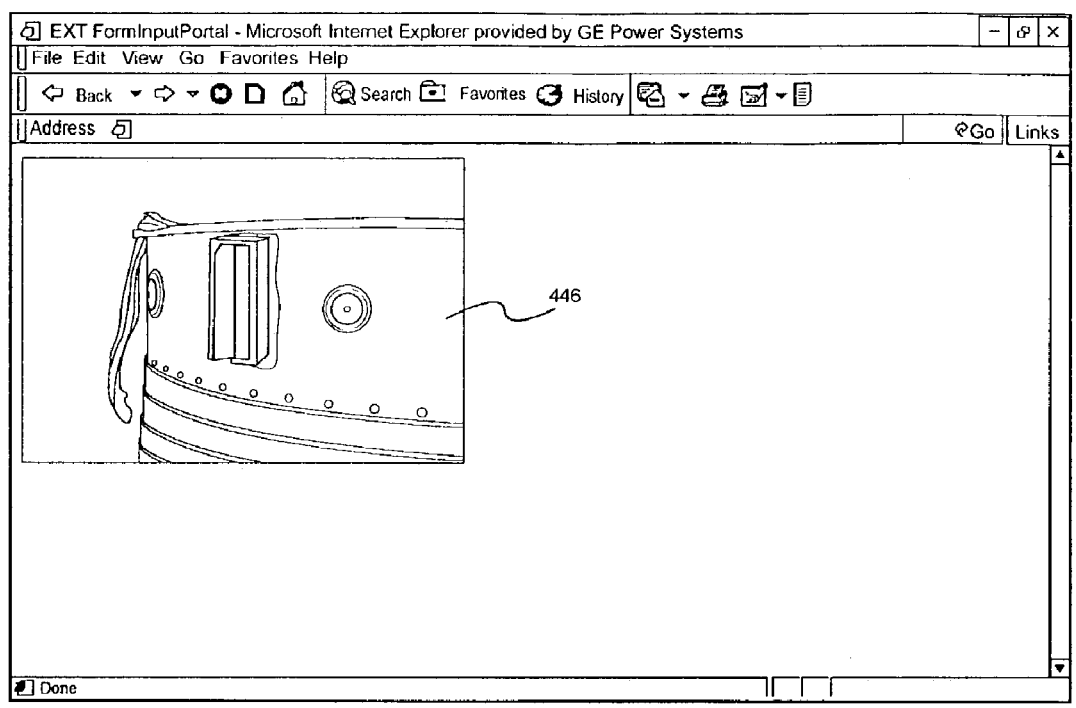
FIG. 19 is an exemplary screen display of the web page resulting from the selection of one of the icons presented in the web page illustrated in FIG. 18.

Accordingly, a particular turbine system component type may be selected in the web page illustrated in FIG. 18 to obtain a visual standard. That is, a particular turbine system component type may be selected to view a picture (e.g., digital photograph) of a component having a light amount, medium amount and heavy amount of wear by selecting the appropriate icon in column 440. For example, FIG. 19 illustrates picture 446 forming a visual standard for a liner stop of the turbine system having a heavy amount of wear. Picture 446 may be displayed upon the selection of icon 440a. Other visual standards for other component types may be obtained through selection of the icon in column 440 corresponding to the appropriate row. Moreover, detailed written notes describing the particular picture forming the visual standard may be obtained by selection of the icon in column 442 corresponding to the appropriate row.

Figure 20:
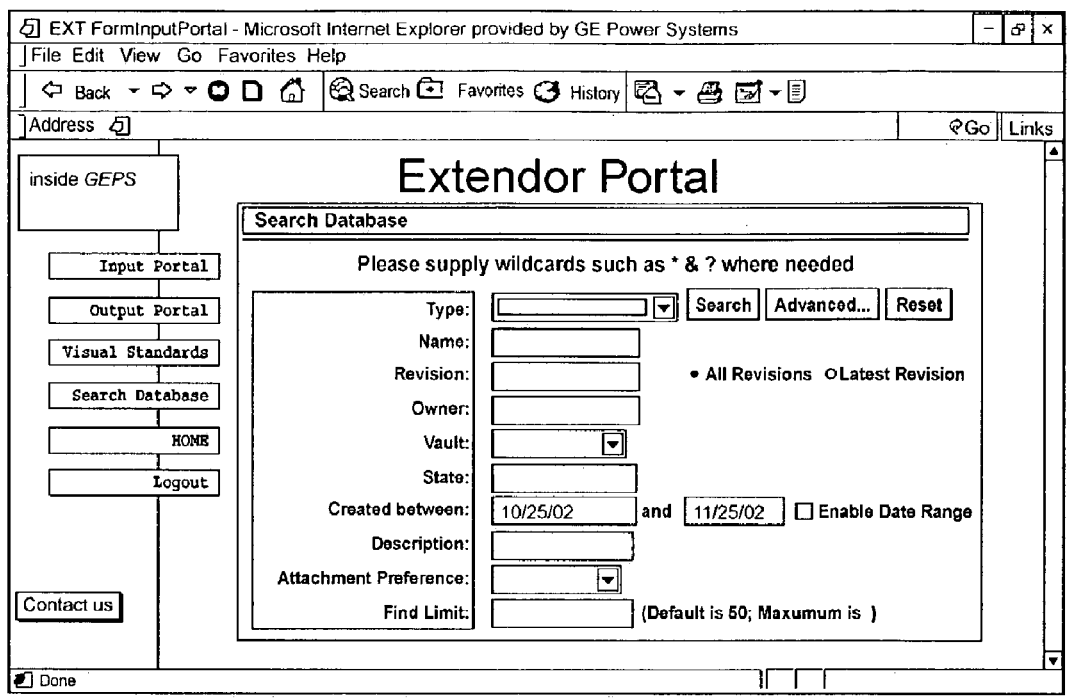
FIG. 20 is an exemplary screen display of the web page resulting from the selection of the link Search Database on the navigation pane of the system in accordance with an exemplary embodiment of the present invention.

FIG. 20 is an exemplary web page resulting from the selection of the link Search Database in navigation pane 350. As can be seen in FIG. 20, information stored in database 318 can be searched through input of the appropriate search criteria. Wild cards such as * and ? may be used by the user where needed. In particular, the user may input one or more of the following fields as search criteria: Type, Name, Revision, Owner, Vault, State, Created Between, Description, Attachment Preference and Find Limit. The Type field allows the user to search for a particular type of turbine system component. The Name field allows the user to enter in a specific inspection site. The Revision field allows the user to search between different edits of the inspection data relating to the same inspection. The Owner field allows the user to use the person who inputs the data (i.e., the field data engineer) as a search criteria. The Vault field allows the user to search for data among various vaults or servers. The State field allows the user to search for the location state (e.g., New York) where the data was entered. The Created Between field allows the user to search for data that is created during a certain time period. The Description field allows the user to search from among any additional information that may be specific to a particular inspection. The field Attachment Preference allows the user to restrict the attachments that the user may want to view. The Find Limit field allows the user to restrict the number of matching hits that the search criteria will find. The user may then select the Search button in FIG. 20 to enable the search or the Reset button to clear the data input in the search fields.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method comprising:
    storing data relating to wear of a component of at least one turbine system in a database of a system for processing wear related information;
    generating a displayable menu for an interface, the menu containing a plurality of user-selectable links respectively associated with software modules of the system; and
    receiving an on-line selection through the interface of one of the user-selectable links to enable the associated software module of the system to generate displayable content including information relating to the wear of the component of the turbine system;
    wherein the wear of the component of the at least one turbine system comprises the wear of a material in one or more of the following turbine components: transition piece body assembly component, bull horn cover, side seal, AFT frame creep, combustion liner assembly component, flow sleeve, cross fire tube and fuel nozzle; and
    the module associated with the selected link enables the displayable content to depict as a digitized photograph, on-line, an example component having a standardized level of wear.

2. In an on-line system for processing wear related data, a method of identifying a component fleet leader from among a plurality of a same type of components in respective turbine systems, the method comprising:
    processing an on-line user selection of a component type of the turbine system;
    searching a database of the on-line system based on the on-line user selection; and
    processing information retrieved from the database as a result of the search including identifying that component from among the plurality of components corresponding to the user-selected component type which has been in operation in its respective turbine system for the longest cumulative time as the component fleet leader.

3. A method of claim 2, wherein selected component type is one of the following turbine component types: transition piece body assembly component, bull horn cover, side seal, AFT frame creep, combustion liner assembly component, flow sleeve, cross fire tube and fuel nozzle.

4. A system for processing wear related information, the system comprising:
- a database for storing data relating to wear of a component of at least one turbine system; and
- a computer system executing a software application including a plurality of software modules to (i) generate a displayable menu containing a plurality of user-selectable links respectively associated with the software modules, and (ii) process a received on-line selection of one of the user-selectable links to enable the associated software module to generate displayable content including information relating to the wear of the component of the turbine system;

wherein the wear of the component of the at least one turbine system comprises the wear of a material in one or more of the following turbine components: transition piece body assembly components, bull horn cover, side seal, AFT frame creep, combustion liner assembly components, flow sleeve, cross fire tube and fuel nozzle; and the module associated with the selected link enables the displayable content to depict as a digitized photograph, on-line, an example component having a standardized level of wear.

* * * * *